(12) United States Patent
Piety et al.

(10) Patent No.: US 11,100,654 B1
(45) Date of Patent: Aug. 24, 2021

(54) DETECTION OF ALIASED PEAK FREQUENCIES IN VIDEO RECORDING (71) Applicant: RDI TECHNOLOGIES, INC., Knoxville, TN (US)

(72) Inventors: Kenneth Ralph Piety, Knoxville, TN (US); Jeffrey R. Hay, Prospect, KY (US); Mark William Slemp, Tellico Plains, TN (US)

(73) Assignee: RDI TECHNOLOGIES, INC., Knoxville, TN (US)

( * ) Notice: Subject to any disclaimer, the term of this patent is extended or adjusted under 35 U.S.C. 154(b) by 0 days.

(21) Appl. No.: 17/126,963

(22) Filed: Dec. 18, 2020

Related U.S. Application Data (60) Provisional application No. 62/950,348, filed on Dec. 19, 2019.

(51) Int. Cl.
*G06T 7/246* (2017.01)
*G06T 7/00* (2017.01)

(52) U.S. Cl.
CPC ........... *G06T 7/248* (2017.01); *G06T 7/001* (2013.01); *G06T 2200/24* (2013.01); *G06T 2207/10016* (2013.01); *G06T 2207/20104* (2013.01); *G06T 2207/30164* (2013.01)

(58) Field of Classification Search
CPC ..... G06T 7/248; G06T 7/001; G06T 2200/24; G06T 2207/10016; G06T 2207/20104; G06T 2207/30164
See application file for complete search history.

(56) References Cited

U.S. PATENT DOCUMENTS

| 9,635,307 | B1 * | 4/2017 | Mysore Vijaya Kumar ................ G06K 9/4642 |
| 10,762,639 | B1 * | 9/2020 | Hay ........................ G06T 7/215 |
| 2014/0371599 | A1 * | 12/2014 | Wu ........................ G06T 7/262 600/476 |
| 2015/0379370 | A1 * | 12/2015 | Clifton ................ A61B 5/0075 382/128 |

OTHER PUBLICATIONS

Sun, Hong-Bo, et al. "Application of the fractional Fourier transform to moving target detection in airborne SAR." IEEE Transactions on Aerospace and Electronic Systems 38.4 (2002): 1416-1424. (Year: 2002).*

Maciejewski, Mark W., et al. "Nonuniform sampling and spectral aliasing." Journal of Magnetic Resonance 199.1 (2009): 88-93. (Year: 2009).*

* cited by examiner

*Primary Examiner* — Pinalben Patel
(74) *Attorney, Agent, or Firm* — Wyatt, Tarrant & Combs, LLP; Stephen C. Hall (57) ABSTRACT

Present embodiments pertain to systems, apparatuses, and methods for analyzing and reporting the movements in mechanical structures, inanimate physical structures, machinery, and machine components, including automatically detecting aliased frequencies of a component on the structure which exhibits frequencies higher than the maximum frequency of the FFT spectrum calculated from the acquired data. To automatically detect the presence of aliased frequencies, a second virtually identical recording is acquired using a slightly different sampling rate and this provides the basis for detecting frequencies which are greater than the Nyquist sampling rate of the video recording and calculating the true frequency value of the aliased peaks in the frequency spectrum.

12 Claims, 12 Drawing Sheets

Fmax = Maximum Frequency of FFT Spectrum

DETECTION OF ALIASED PEAK FREQUENCIES IN VIDEO RECORDING

CROSS REFERENCE TO RELATED APPLICATIONS

This application claims the benefit of priority to U.S. Provisional Application No. 62/950,348, which was filed on Dec. 19, 2019, the contents of which are fully incorporated herein by reference.

FIELD OF INVENTION

Multiple embodiments described and provided for herein pertain to systems, apparatuses, and methods for analyzing one or more motions captured in video recordings of machinery, machine components, and inanimate physical structures, in performing maintenance or performing predictive maintenance upon such machinery, components, and structures.

BACKGROUND

All machines and physical structures produce vibrations and resonances of various kinds. Some may be characteristic of normal operation, while others may indicate off-normal conditions, unusual wear, incipient failure, or other problems. In the field of predictive maintenance, the detection of abnormal vibrational signatures is a key element of the diagnostic process in which the goal is to identify and remedy incipient problems before a more serious event such as breakdown, failure, or service interruption occurs. When analyzing the vibration frequency spectrum of a mechanical component, it is critical to have an accurate knowledge of the measured frequency—the rate at which a machine, component, or structure undergoes periodic motion such as rotational or reciprocating motion. Conventionally, vibration analysts make vibration measurements with individual probes, such as accelerometers, then process the data through modern machinery analyzers as known in the art. In some settings, a user (i.e., analyst) need not be concerned with aliased frequencies, as discussed further below, appearing in their data because the analyzers prevent this from occurring. A standard technique by which this is prevented occurs when frequencies above the Nyquist frequency, which is one half of the sampling rate of the analog-to-digital converter, are removed from the signal using analog filters before digitizing the data. However, dynamic data measured with cameras (e.g., digital video cameras) does not apply filtering to the signal before it is digitized and thus cannot prevent the occurrence of aliased frequencies. As just one example, a common observation by laypersons of this effect occurs when, in an old western movie, wagon wheels appear to be turning backward but the wagon is moving forward. This effect occurs when aliased peaks which are present in the frequency spectrum fold back upon a base analysis frequency span, causing the movements associated with the aliased peaks to appear as lower frequency movements than the actual frequency (in the above example, rotational movement of the wagon wheel).

Consequently, the presence of aliased frequencies in vibration data cannot be determined by examining the waveform or spectrum of a vibration signal analyzed at one sampling rate. Undesirably, this could cause vibration data collected from a camera to be incorrectly analyzed or to have incorrect conclusions drawn by an analyst about the source of the motion. Even if an analyst suspects that some of the frequencies in his spectral data are aliased frequencies, it would be very laborious to determine which frequencies are aliased and determine the true frequency values. Accordingly, capabilities provided for in present embodiments can be integrated into a video vibration measurement system. One such system is the IRIS Motion Amplification System manufactured by RDI Technologies Inc. (Knoxville, Tenn.).

Further, camera vendors do not provide anti-aliasing protection in their units; and thus, an alternative method for automatically detecting an aliased frequency in visually recorded data and determining its true value is needed. An automated method for accomplishing this purpose will save the analyst a great deal of time and help prevent analysis errors. Present embodiments accomplish this goal by collecting video recordings at two different sampling rates, identifying peaks in the frequency spectrum which change location, and applying an iterative algorithm to determine the true frequency values. Stated differently, when conditions that contribute to aliasing exist, if all of the video recordings obtained for a structure during a troubleshooting investigation are captured at the same frame rate (i.e., sampling rate), it would be impossible to determine whether any particular frequency might be aliased and be certain of the true frequency value. Since each pixel is a motion sensor in video data, the frequencies present in the motion at a second pixel, or set of pixels, may be different, especially as the distance between pixels is larger and/or falls on different objects in the field of view. The large number of frequencies present from different components or elements in the field of view would be quite laborious to ascertain the true frequency values without automating a process in the analysis software.

SUMMARY

Multiple embodiments described and provided for herein pertain to systems, apparatuses, and methods for analyzing and reporting movements which are captured (i.e., acquired) in video recordings of mechanical structures, inanimate physical structures, machinery, and machine components. In some aspects, a capability is provided to automatically detect aliased frequencies when analyzing such movements and determine their true frequency value. The practice of present embodiments is appropriate for motion at frequencies higher than the maximum frequency of the FFT spectrum calculated from the acquired data. This is advantageous because recordings acquired from video cameras are not protected from higher frequency phenomena creating aliased peaks in the calculated FFT spectrum, which is normally accomplished by applying analog filters to signals before the signal is digitized. Additional capabilities include, but are not limited to, processing of visual data related to such movements; detecting frequencies which are greater than the Nyquist sampling rate of the video recording and calculating the true frequency value of the aliased peaks in the frequency spectrum.

In some embodiments, user activity or user input such as through a graphical user interface causes the following steps to occur to obtain good recordings and provide for automated detection of aliased frequencies associated with motion of an object, i.e., machine, structure, or machine component:

1. user positions one or more video acquisition devices (such as but not limited to video cameras, webcams, or digital cameras integral in cells phones, and for brevity sometimes referred to herein as "cameras"), to obtain video recordings of the equipment of interest (i.e., machine, structure, or machine component), to include at least a portion of the equipment of interest in motion, and optionally focuses the camera;

2. user selects a sampling rate in frames per second (fps), and sets the duration in seconds for the recording;

3. user optionally adjusts the aperture, gain, and brightness, and may add external light or shield the field of view in the presence of bright conditions to achieve acceptable lighting conditions for recording;

4. user initiates acquisition of video recording and saves the video recording;

5. if auto-aliasing detection is selected, a second recording will be collected at a second, slightly different sampling rate determined either by the user or automatically, which is greater than (+/−) 5 times but less than (+/−) 10 times a frequency resolution of the recording, wherein frequency resolution in Hertz is the reciprocal of the total sampling time in seconds processed by the FFT algorithm; and 6. the second video recording is stored and can be used during the analysis of any region of interest (ROI) in the field of view to automatically identify aliased peaks in the spectral data; wherein a user may examine many different ROIs during the analysis process.

The numbering provided in the above steps is not meant to indicate that these steps are required to be performed in the exact order shown. In a preferred embodiment, the second recording is captured by the same camera where nothing has been changed except the sampling rate. In this embodiment, the ROI would spatially occur at the same pixels as selected in the first recording. Alternatively, the second recording mentioned above, or subsequent recordings, can be acquired from a different camera positioned to capture motion of the same object. This might require more user interaction or object recognition algorithms to locate the ROI in the second recording. Also, other factors could alter data acquisition setup parameters besides the frame rate, such as the duration of the recording, aperture, or brightness controls, focus or aperture adjustments, external lighting, or the position of the camera. In this case, if the motion in the ROI is still captured effectively, the steps and algorithms provided for herein for identifying aliased peaks would remain the same, but recognizing that the more things that are changed, the more likely that the motion measured in the ROI may be modified to some degree and not compare as closely to the first recording.

Acquiring data collected at extremely high sampling rates would tend to minimize the likelihood of the aliased peaks occurring in the frequency spectrum, but it cannot guarantee that aliasing will not occur since there is no way to know a priori what frequencies may be present in the measured data. Additionally, sampling at very high rates may not be possible due to camera limitations or because this will dramatically increase the amount of data that must be manipulated and stored to be able to properly diagnose and assess lower frequencies.

BRIEF DESCRIPTION OF DRAWINGS

The drawings, schematics, figures, and descriptions contained in this application are to be understood as illustrative of steps, structures, features and aspects of the present embodiments. Accordingly, the scope of embodiments is not limited to features, dimensions, scales, and arrangements shown in the figures.

MULTIPLE EMBODIMENTS AND ALTERNATIVES

In accordance with multiple embodiments and alternatives, a system or a method for studying motion of an object using a video recording of a machine, component, or physical structure in motion collects at least two sets video recordings (i.e., two sets of data) for the same field of view or region of interest. The camera acquisition parameters are the same for both data sets, but the video data is obtained at a slightly different sampling rate. The second data set is stored with the original recordings taken to investigate the dynamic motion of the mechanical structure. Spectral data (i.e., frequency spectrum) obtained from any location in the field of view (or region of interest) is automatically compared to a frequency spectrum obtained from the second recording. The comparison enables one to determine if any of the frequencies in the first spectrum are due to aliasing and determine the accurate frequency value if that is the case. If no aliased peaks are found in the field of view from the first data set collected with auto-aliasing detection turned on, then a user may elect to turn this feature off when collecting subsequent views of the scene since this feature will double the data storage required. If such an election is made, going forward even if aliased peaks may occur in other recordings, then information obtained from the first data set when auto-aliasing detection was active may provide enough information to correctly interpret aliased peaks in the subsequent recordings. This feature will enhance an analyst's ability to correctly identify all frequencies present in the vibration measured on the machine, component, or physical structure. When diagnosing fault conditions specific to such a machine, component, or structure, it is critical to know the accurate frequency location of spectral peaks. For example, determining whether frequencies are sub-synchronous, synchronous, or non-synchronous with respect to the operation speed of a rotating machine is key to understanding the underlying fault condition. Mislabeling the frequency value of a peak would likely lead to drawing incorrect conclusions about the structure being investigated. Accordingly, embodiments provided for herein offer improvements and greater efficiency in detecting aliased peaks and determining their true frequency value than methodologies practiced prior to the current embodiments.

Accordingly, in one embodiment provided for herein, a user (or the system described herein where indicated):

1. positions the camera to acquire the perspective of the equipment of interest, containing at least a portion of the component in motion;

2. focuses the camera;

3. optionally adjusts the aperture, the gain, and brightness, and may add external light or shield the field of view in the presence of bright conditions to achieve acceptable lighting conditions for recording;

4. selects the sampling rate in frames per second and enters the length of data to record in seconds;

5. enables the auto-aliasing detection feature;

6. collects a first recording and stores it in a memory operably linked to computer-readable program instructions, wherein current embodiments are not limited to the particular form of memory selected;

7. the system then automatically collects a second recording with all acquisition parameters the same except at a slightly different sampling rate; in some embodiments the sampling rate for the second collection is greater than (+1) 5 times but less than (+/−) 10 times the frequency resolution of the first recording; and 8. the second recording is stored and can be used during the analysis of any region of interest in the field of view to automatically identify aliased peaks in the spectral data at a user's prompting.

The numbering provided in the above steps is not meant to indicate that these steps are required to be performed in the exact order shown.

Figure 1:
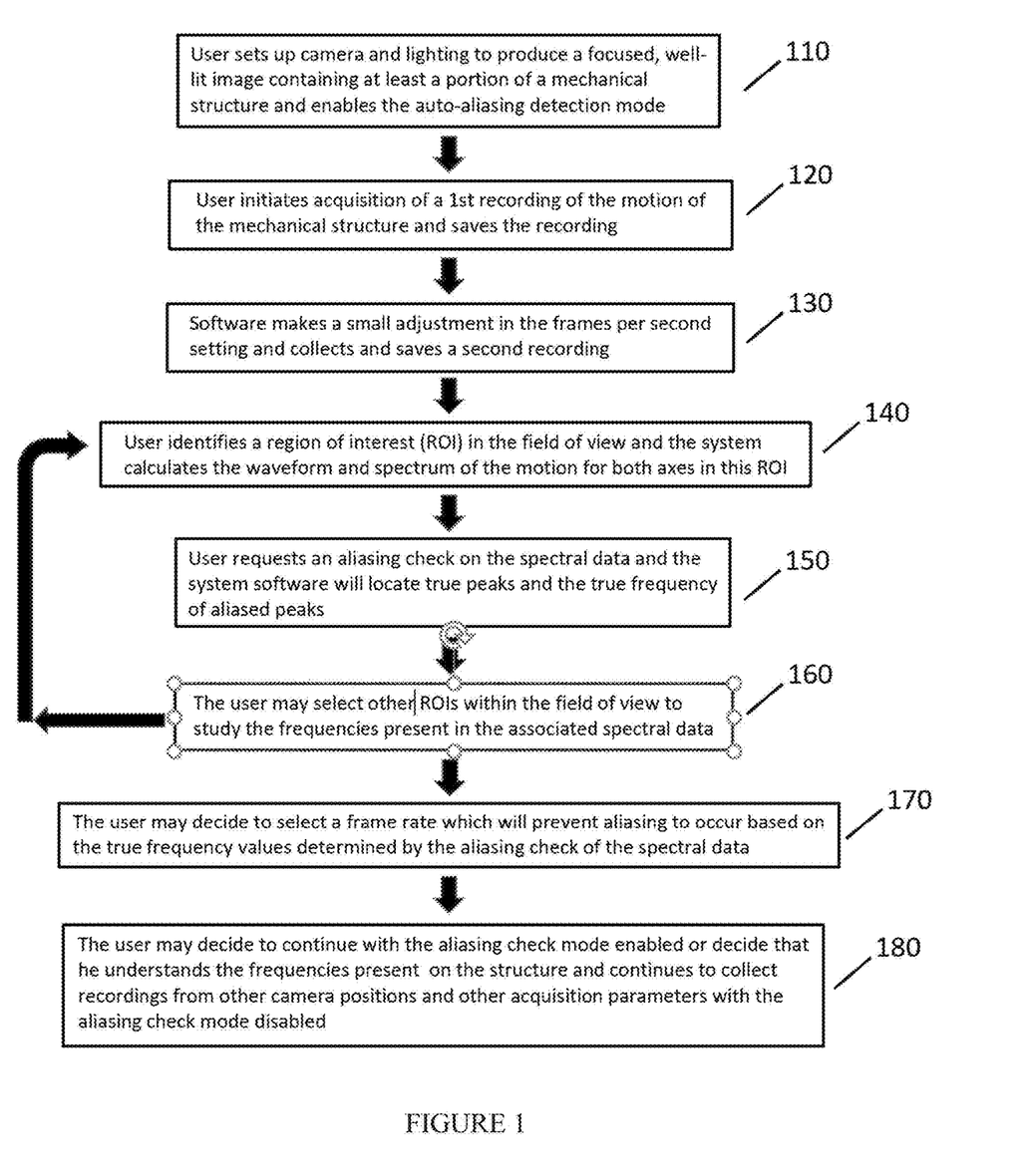
FIG. 1 is a flowchart for applying an auto-aliasing detection mode in video acquisition system to study motion in a mechanical structure, according to multiple embodiments and alternatives.

A flowchart describing this approach for incorporating an auto detection mode into a motion video collection and analysis system is shown in FIG. 1. At step 110, a user sets up a camera and lighting to produce a focused, well-lit image containing at least a portion of a mechanical structure and enables the auto-aliasing detection mode. At step 120, the user initiates an acquisition to obtain a first video recording of the motion of the mechanical structure and saves the recording. Then at step 130, the software running in accordance with the methods herein make some adjustment, which can be a small change, in the frames per second setting and collects, and saves a second video recording. At step 140, the user identifies a region of interest (ROI) in a field of view and the system calculates the waveform and spectrum of the motion for both axes in this ROI. As described further below, at step 150, the user can then request an aliasing check on the spectral data, whereby the software will locate true peaks and the true frequency of aliased peaks.

At step 160, the user optionally has the program return to step 140 and selects other ROIs in the field of view to study frequencies present in the associated spectral data from motion appearing in such other locations of the video recording. When one or more ROIs have been interrogated in this way, at step 170 the user may select a frame rate, suitable to prevent aliasing from occurring based on the true frequency values determined at step 150. Finally, at step 180, the user may decide to continue with the aliasing check mode enabled or decide that he understands the frequencies present on the structure and continue to collect recordings from other camera positions, or using other acquisition parameters with the aliasing check mode disabled.

Although such an exemplary method for locating aliased peaks is presented for a user-selected ROI, the ROI could be considered in the smallest case to be a single pixel. In this embodiment, the user would not need to select a ROI, but the software would examine the frequencies present in the variation of the pixel intensity and compare this against the same pixel in the second recording. This comparison could be applied to all the pixels in the field of view or a subset of the pixels, for example, the greatest variation in intensity, and alert the user to aliased frequencies present in the recording.

Figure 2A:
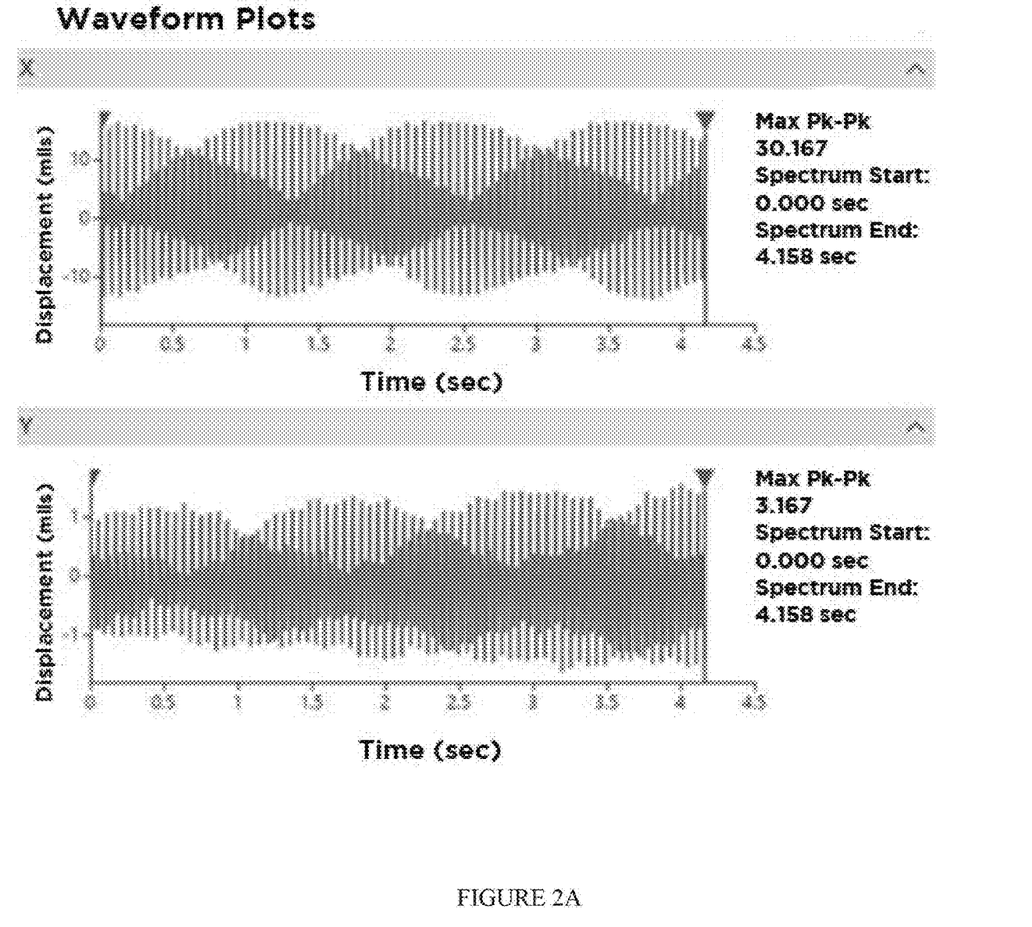
FIG. 2A depicts analysis screens showing outputs as waveform graphs, from a recording collected at 120 frames per second of dynamic motion of a machine pictured in FIG. 2C, measured at a region of interest (or, ROI) identified by a square on the image of the rotor kit in FIG. 2C, according to multiple embodiments and alternatives.
Figure 2B:
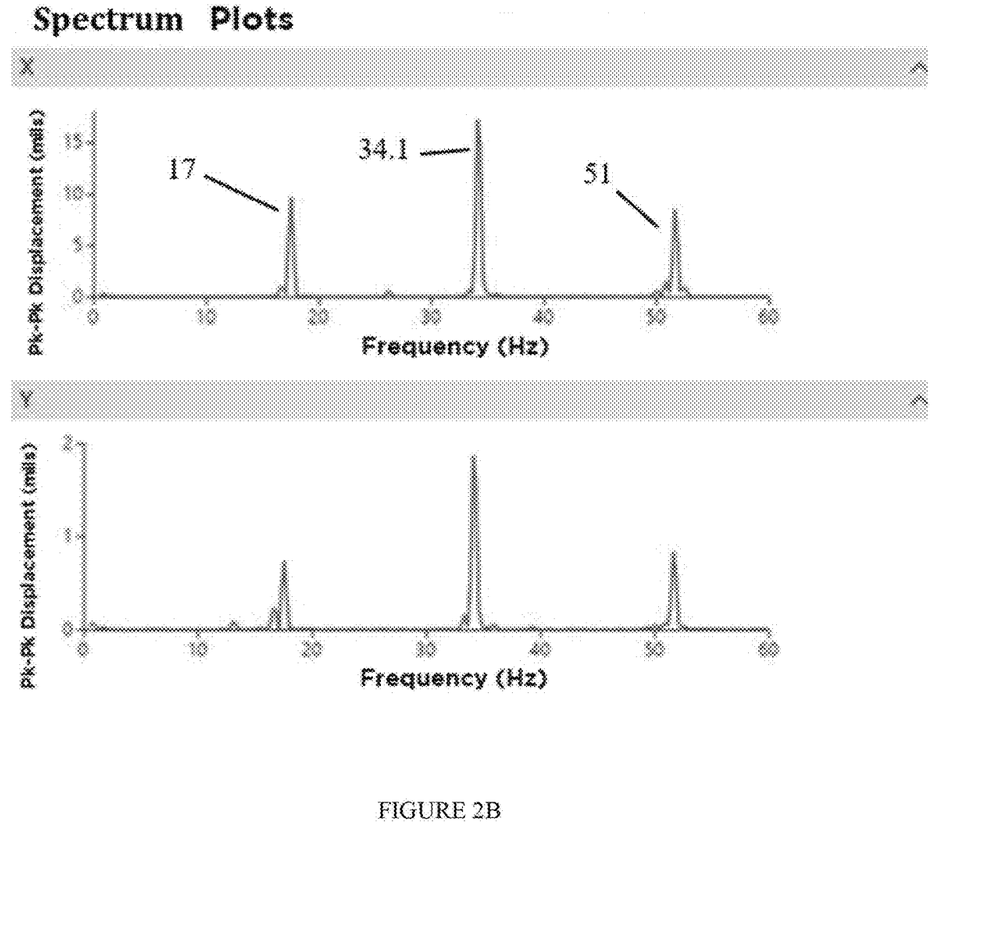
FIG. 2B depicts analysis screens showing outputs as frequency spectrum graphs, respectively, from a recording collected at 120 frames per second of dynamic motion of the machine pictured in FIG. 2C, measured at the same region of interest identified by the square on the image of the rotor kit in FIG. 2C, according to multiple embodiments and alternatives.
Figure 2C:
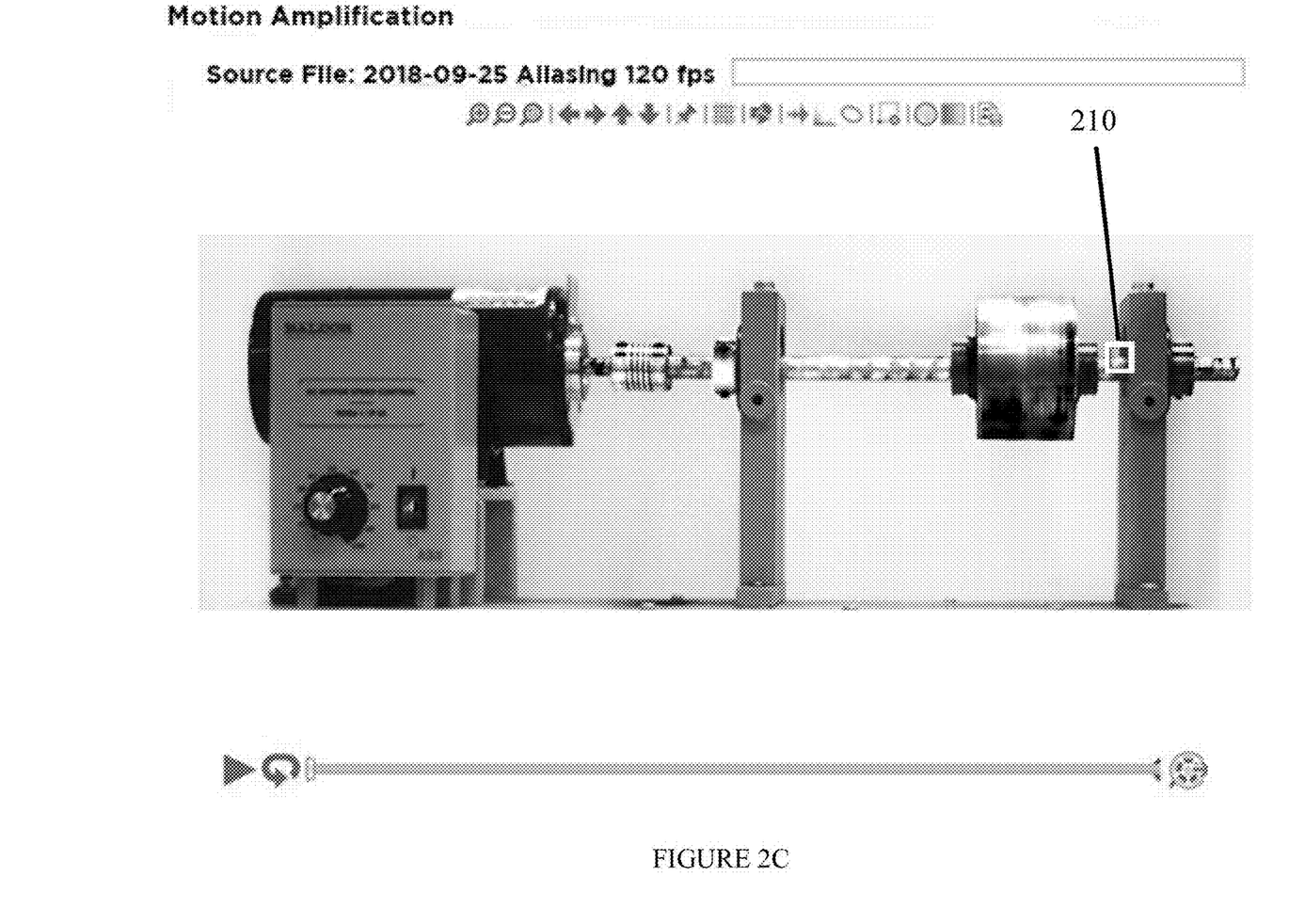
FIG. 2C is a picture of a rotor kit with a region of interest indicated by a square, 210, analyzed in accordance with multiple embodiments and alternatives.

FIGS. 2A-2C and FIGS. 3A-3B present an exemplary analysis of motion where aliasing occurs, in accordance with embodiments described herein. FIGS. 2A-2B depict analysis screens showing waveform graphs (displacement against time, over a period of 4.158 sec.) and frequency spectrum graphs (displacement against frequency), respectively, for the x-axis and y-axis motion from a recording collected at a first sampling rate, 120 fps, of the dynamic motion of the rotor kit shown in FIG. 2C. This motion in the graphs was measured for the ROI identified by the square, 210, on the image of the rotor kit shown in FIG. 2C. Both the waveform and frequency spectrum graphs present motion measured in the x-axis and y-axis of the ROI. The peaks in the frequency spectrum appear to occur as a first peak, 17, at 17.50 Hz; a second peak, 34.1, at 34.16 Hz; and a third peak, 51, at 51.65 Hz, with the peaks labeled for the x-axis graph and also occurring at the same locations for the y-axis motion depicted in FIG. 2B. However, the Nyquist frequency for this data (one-half of sampling rate) is at 60 Hz, and frequencies in the data higher than this frequency will fold back on to the spectrum at a different frequency location.

Figure 3A:
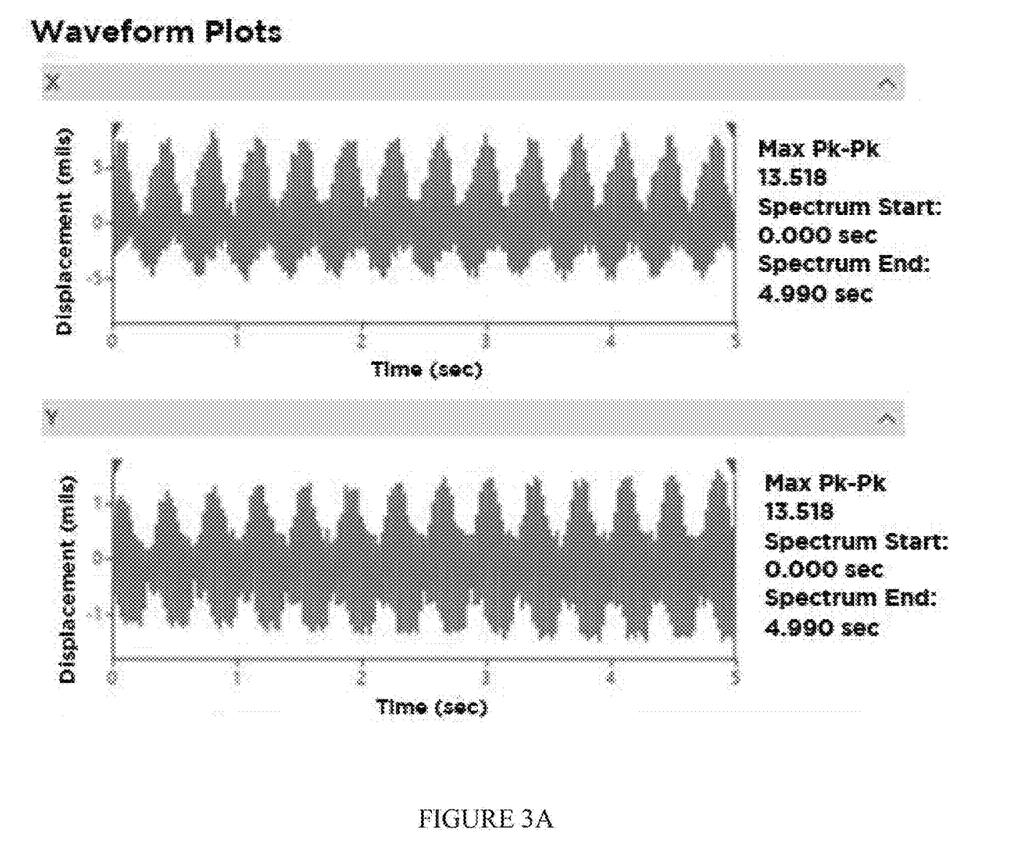
FIG. 3A depicts analysis screens showing the x-axis and y-axis waveform graphs, from a recording collected at a different sampling rate, 100 fps, for the same motion presented in FIGS. 2A-2B collected at the ROI on the rotor kit in FIG. 2C, according to multiple embodiments and alternatives.
Figure 3B:
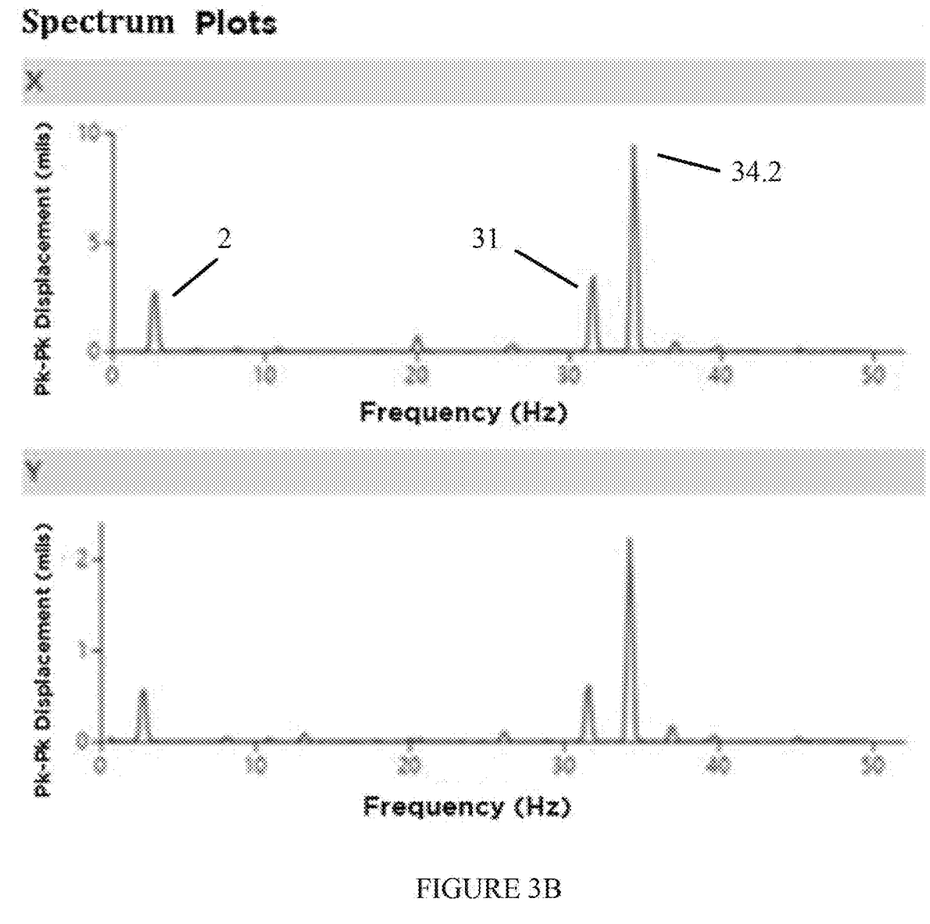
FIG. 3B depicts analysis screens showing the x-axis and y-axis frequency spectrum graphs from a recording collected at the sampling rate of 100 fps, for the same motion presented in FIGS. 2A-2B measured at the ROI on the rotor kit in FIG. 2C, according to multiple embodiments and alternatives.

In turn, FIGS. 3A-3B depict analysis screens which are part of the same exemplary analysis discussed in FIGS. 2A-2B, this time showing a waveform graph (displacement against time) and a frequency spectrum graph (displacement against frequency), respectively, obtained from a second recording collected at a second sampling rate of 100 fps for the x-axis and y-axis motion. Again, these graphs obtained from the recording are for the dynamic motion measured at the ROI identified by the square, 210, on the image of the rotor kit in FIG. 2C. This screen has been broken into two sections to make the image more legible. The peaks in the frequency spectrum appear to occur at a first peak, 2, at 2.72 Hz; a second peak, 31, at 31.53 Hz; and a third peak, 34.2, at 34.2 Hz, with the peaks labeled for the x-axis graph, and also occurring at the same locations for y-axis motion depicted in FIG. 3B. The Nyquist frequency for this data is at 50 Hz and frequencies in the data higher than this frequency will fold back on to the spectrum at a different frequency location. The true frequencies of the three peaks which appear in the spectrum are 34.16, 68.34, and 102.50 Hz. Thus, the 17.50 Hz and 51.65 Hz peaks in FIG. 2B are aliased peaks whose true frequency values are 102.50 Hz and 68.34 Hz, respectively. In FIG. 3B, both the 2.72 and 31.53 Hz peaks in FIG. 2B are aliased peaks whose true frequency values are 102.50 and 68.34 Hz, respectively. Clearly, any attempt to analyze the mechanical structure in the recorded video would lead to erroneous conclusions if the analyst used the frequency of the peaks in either one of aliased data recordings.

Figure 4A:
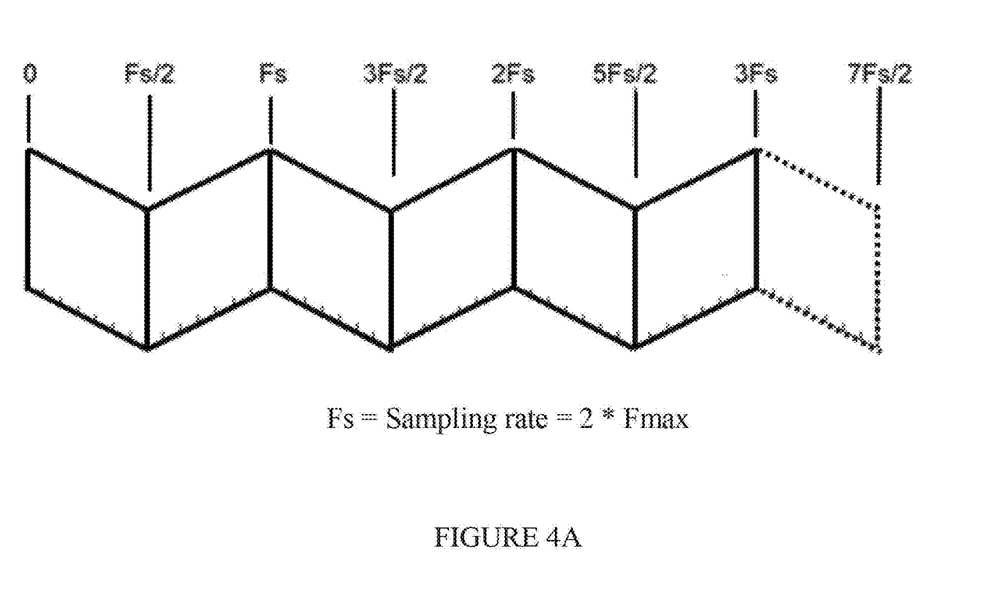
FIG. 4A is a representation demonstrating how aliased frequencies fold back into the base band of the frequency spectrum from the higher frequencies in an accordion fashion with multiples of the Nyquist frequency (Fs/2=half of the sampling rate) as hinge points.

FIG. 4A is a representation demonstrating how aliased frequencies fold back into the base band of the frequency spectrum from the higher frequencies in an accordion fashion with multiples of the Nyquist frequency (Fs/2=half of the sampling rate) as hinge points. As previously noted, a problem in detecting aliased frequencies occurs because these peaks fold back into the base band of the frequency spectrum from the higher frequencies in an accordion fashion with multiples of the Nyquist frequency (Fs/2=half of the sampling rate) as hinge points. This is illustrated in FIG. 4A and FIG. 4B.

Figure 4B:
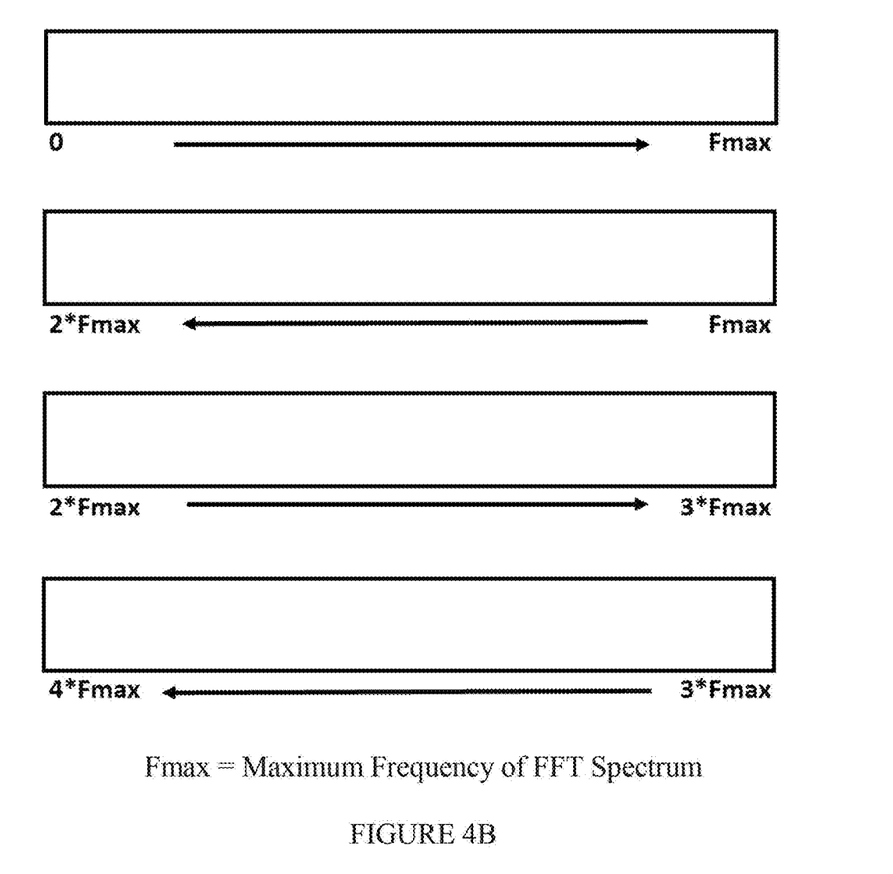
FIG. 4B demonstrates how a FFT (Fast Fourier Transform) spectrum will show frequencies up to its maximum frequency (Fmax) which is equal to half of the sampling rate used during video recording and data acquisition, such that aliased peaks fold back and forth across the spectrum as illustrated.

The representation in FIG. 4B indicates that the FFT spectrum will show frequencies up to its maximum frequency (Fmax), which is equal to half of the sampling rate used to acquire the data, and aliased peaks fold back and forth across the spectrum as illustrated. Above Fmax, higher frequencies fold back into the base band of the frequency spectrum in an accordion fashion, with multiples of the Nyquist frequency (Fs/2=half of the sampling rate) as the hinge points. In the practice of current embodiments, the formulas below can be used to determine where a frequency higher than the maximum frequency in the FFT spectrum will appear as an aliased peak in the baseband of the spectrum, as follows.

TF=True Frequency
AF=Aliased Frequency
FR=Frequency Ratio
FR=TF/Fmax=N·Frac
(where for N·Frac, there is an integer portion, N, and a fractional portion, Frac).
If N is odd, then AF=Fmax−Frac*Fmax
If N is even, then AF=Frac*Fmax It follows from the above discussion that the same aliased frequency can result from any number of higher frequency peaks. For example, if Fmax of a particular spectrum is 50 Hz, then an aliased peak falling at 10 Hz at a sampling rate of 100 fps could be a result of true peak frequencies at 90 Hz, 110 Hz, 190 Hz, 210 Hz, etc. Thus, there is no way to determine the true frequency of an aliased peak from data collected at one sampling rate. However, a true value can be determined if the same data is acquired at two or more sampling rates.

Accordingly, in some embodiments, a system or method as described herein automatically determines the true value of the aliased peaks by using two recordings collected in close succession with identical acquisition parameters except for a change in the frame rates of the recordings. The amount of change in sampling rate for the data may be expressed in frames per second and should be large enough to move aliased peaks at least 5R and no greater than 10R, where R is the frequency resolution of the spectral data. This is enough movement to make a change in location of an aliased peak distinct, but not so great as to increase the difficulty of locating the matching peak in the second recording. While the above illustrates an exemplary use, variants of this approach also are contained in the scope of present embodiments. For example, any change in the sampling rate can be used outside of the 5R-10R range mentioned, but it may complicate matching the location of the aliased peaks in the second recording.

In some embodiments, the software automatically selects an adjusted sampling rate for the second recording. As used herein, terms such as software, software program, and software algorithm refer to computer-readable program instructions. Additionally, in a preferred embodiment, the frequency peaks should be identified more accurately by using one of several possible techniques known to those skilled in the art, such as a fitting algorithm or the mathematical formulas which take into account the windowing function that has been applied to the waveform data prior to performing the FFT algorithm.

In light of the range of approaches mentioned above, persons of skill in the art may perceive that a possible challenge is that an aliased peak could be moved to a position that exactly matches another existing peak, albeit one that was not aliased. This is not highly likely, but if such an instance were to occur, it would mean that a different number of peaks would be identified in the two recordings. In this case the user or the software should select a different sampling rate for the second recording for identifying aliased peaks, as the locations of non-aliased peaks in a frequency spectrum do not change when the sampling rate of the recording is modified.

Figure 5A:
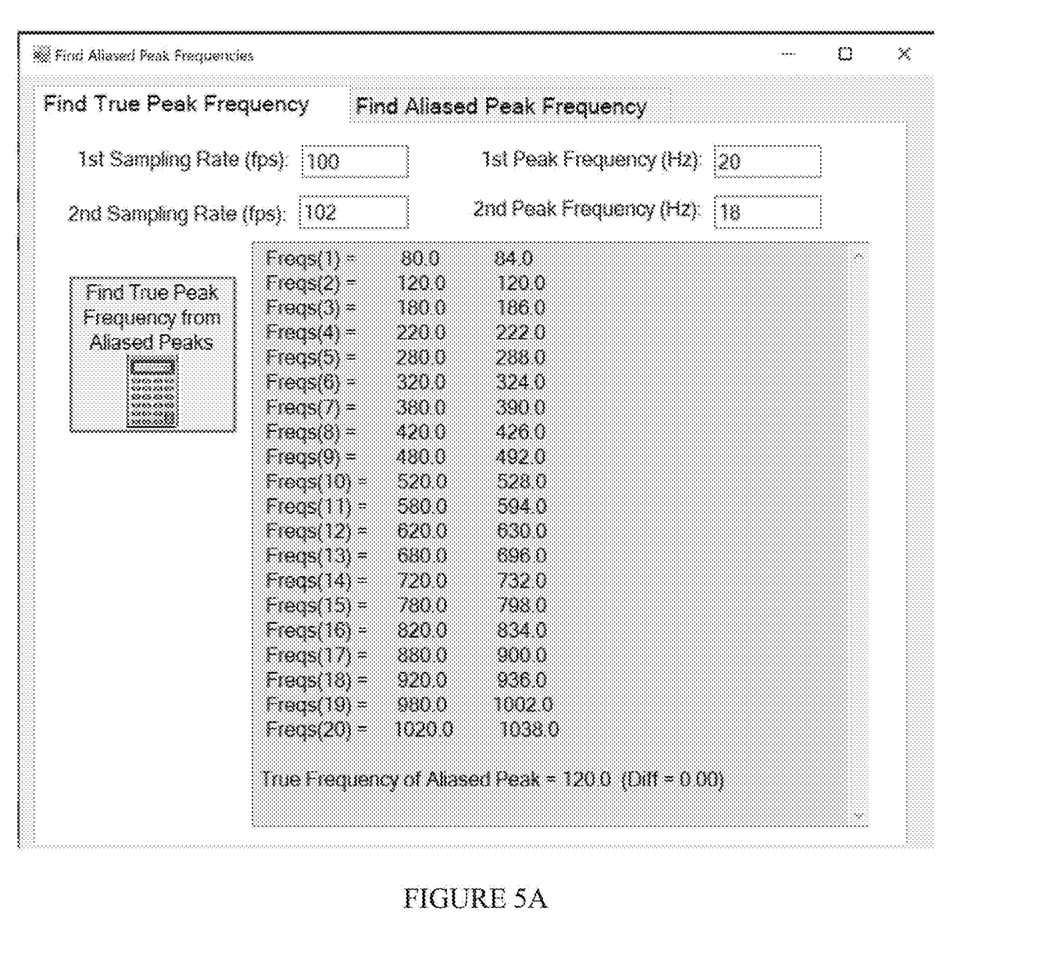
FIG. 5A shows an output screen for a software program that calculates the true frequency of aliased peaks at 20 Hz and 18 Hz in two spectra associated with video of motion acquired with different sampling rates, according to multiple embodiments and alternatives.
Figure 5B:
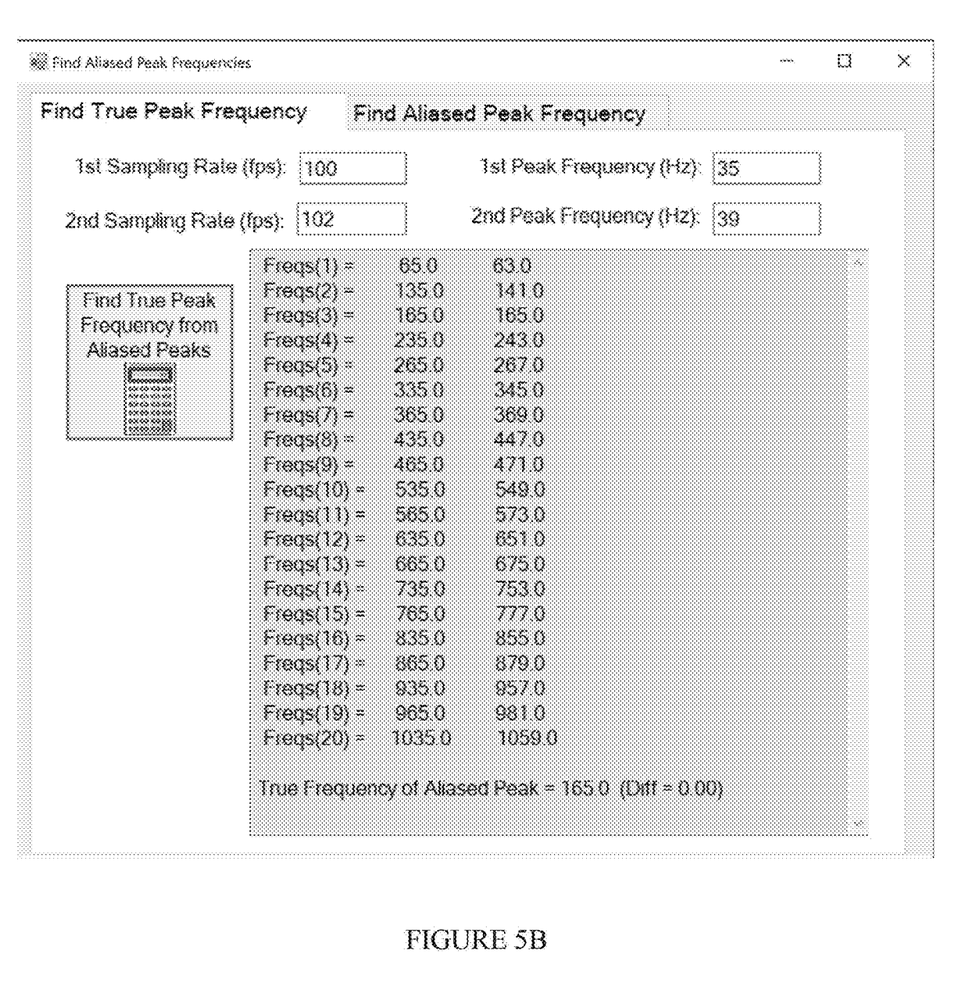
FIG. 5B is an output screen for a software program that calculates the true frequency of an aliased peaks which occur at 35 Hz and 39 Hz in two spectra associated with video of motion acquired with different sampling rates, according to multiple embodiments and alternatives.

Another exemplary use of the present embodiments will further illustrate the use of embodiments provided herein in the context of tables shown in FIGS. 5A-5B. Suppose that a waveform is collected at 100 fps (i.e., derived from a video recording acquired at 100 fps) and the resultant FFT spectrum presents peaks at 10 Hz, 20 Hz, 24 Hz, and 35 Hz. A second waveform is collected at 102 fps (i.e., derived from a video recording acquired at 102 fps) and the resultant FFT spectrum presents peaks at 10 Hz, 18 Hz, 24 Hz, and 39 Hz.

TABLE 1

|  | Spectral Peaks | | | |
| --- | --- | --- | --- | --- |
| First spectrum (100 fps sampling rate): | 10 Hz | 20 Hz | 24 Hz | 35 Hz |
| Second spectrum (102 fps sampling rate): | 10 Hz | 18 Hz | 24 Hz | 39 Hz |

The peaks at 10 Hz and 24 Hz are not aliased since their frequency locations did not change, and their amplitudes are very similar. On the other hand, the peak at 20 Hz in the first spectrum has changed to 18 Hz in the second spectrum and the peak at 35 Hz appears to have moved to 39 Hz. FIG. 5A shows an output screen for a software program that calculates the true frequency of the aliased peaks at 20 Hz and 18 Hz from their respective spectra obtained from video of motion acquired at different sampling rates, listed in the Figure as 100 fps and 102 fps. In this context, the peaks at 20 Hz and 18 Hz are referred to as a matching pair, because they relate back to the same true frequency. In the instance of FIG. 5A, the true frequency of the aliased peaks which occur at 20 Hz (first spectrum in Table 1) and 18 Hz (second spectrum in Table 1) is calculated to be 120 Hz, which is the peak where a match exists as found in both the 100 fps output and the 102 fps output. FIG. 5B shows an output screen resulting from execution of a software program that calculates the true frequency of the aliased peaks which occur at 35 Hz in the first spectrum and 39 Hz in the second spectrum, again listed in the Figure as 100 fps and 102 fps. In the instance of FIG. 5B, the true frequency of the aliased peak is calculated to be 165 Hz.

Tables 5A-5B contain the output from a software algorithm that iterates through possible true peak values which would occur at higher multiples of the baseband frequency and finds a matching value in both columns of possible true peak frequencies found at each sampling rate. The true frequency is the improved by using located peak values rather than the nominal peak value which is simply the frequency line in the spectrum with the highest amplitude. In a spectrum with a calculated 1 Hz frequency resolution, for example, the nominal peak value might be 22 Hz because the frequency line at 22 Hz has the highest amplitude of 2. The amplitude value at 21 Hz might be 0.05 and the line at 23 Hz might be 1.9 indicating that the true peak frequency lies between 22 Hz and 23 Hz. As known to persons of ordinary skill in signal processing art, the true frequency value can be estimated more accurately by applying formulas that consider the windowing function used when calculating the FFT frequency spectrum. In the case above, the true value would be about halfway between the two lines giving a located peak frequency of 22.4 Hz. Using located peak values will result in the correct matching pair of possible true frequency values being very close in value and significantly reduce the chance of selecting the wrong pair. The FFT could be constructed using any number of windows such as the Uniform, Hanning, Hamming, Blackman-Harris, Kaiser-Bessel, or others. More accurate frequency estimates of the peak location can be calculated using the parameters that are characteristic of the respective windows. An improved location of the peak frequency can also be accomplished by applying any number of well-known fitting algorithms to the center line in the peak and the 2 lines on either side. The generic fitting algorithms are generally not as accurate as using the algorithm that takes into account the FFT windowing functions. Again, these approaches simply make the location of matching pairs closer as indicated in the discussion above following Table 1, but will not calculate a true frequency of aliased peaks. Accordingly, embodiments herein could use any of the methods discussed or those obtaining equivalent improvements in locating the peak frequency values. Nominal peak frequency values can also be used, but would not provide as reliable results in some cases where a greater difference would appear for the closest matching pair of frequency values.

Figure 6:
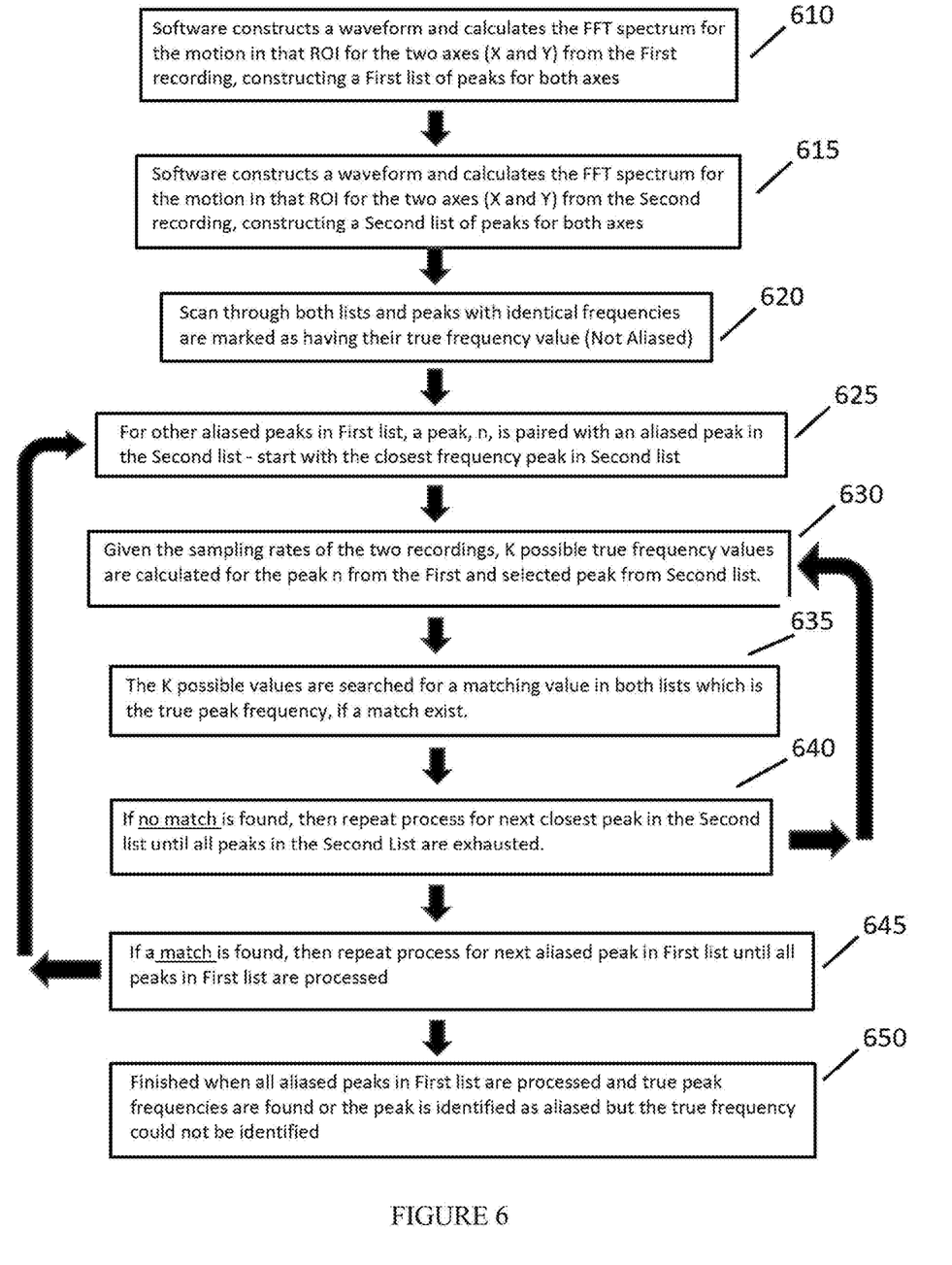
FIG. 6 is a flowchart which represents an iterative algorithm for locating the true value of aliased peaks in video recorded data, according to multiple embodiments and alternatives.

Accordingly, a software algorithm as practiced in the context of present embodiments greatly facilitates the identification of the true frequency location of aliased peaks when investigating the motion in a video recording. Although an analyst might follow the steps to identify aliased peaks and determine their true value, the process is tedious and error prone due to the number of possible combinations that must be investigated. Furthermore, an analyst may elect to investigate numerous ROIs from one recording, and each ROI may present 20 or more peaks. FIG. 6 is a flowchart which represents an iterative algorithm for locating the true value of aliased peaks in video recorded data. At step 610, the software constructs a waveform and calculates the FFT spectrum for the motion in that particular ROI for the two axes (X and Y) from the first video recording and constructs a first list of peaks for both axes. At step 615, the same process occurs upon the second video recording, resulting in a second list of peaks for the X and Y axes, obtained using a different sampling rate than the first list of peaks. Step 620 indicates that the software then scans both lists of peaks, and identical frequencies are marked as having their true frequency value (i.e., not aliased). Ruling out unaliased peaks facilitates the detection of aliased peaks in the lists. At step 625, for other aliased peaks in the first list, a peak, n, is paired with an aliased peak in the second list, similar to what was discussed in Table 1 above. For a given peak, n, in the first list, it may be helpful to start with the closest frequency peak in the second list.

At step 630, the sampling rates of the two recordings are considered in calculating a number, K, of possible true frequency values for the peak, n, from the first list, and a selected peak from the second list as shown in the examples provided in FIGS. 5A and 5B where K was equal to 20. At step 635, the K possible values are evaluated by the software to determine if a matching value is found in both the first list and the second list. If a match exists, this is the true peak frequency and this peak is removed from the second list as a candidate for future searches. Conversely, step 640 indicates that if no match is found, the software returns to step 630, and the next closest peak in the second list is selected and the process is repeated for step 635. This process continues until the matching aliased peak in the second list is found and a true frequency value is determined, or all peaks in the second list eventually will be exhausted and the true value cannot be determined. As step 645 indicates, once a matching pair is found between the first list and the second list match or the peaks in the second list are exhausted, the software repeats the above process for the next aliased peak indicated in the first list, until all aliased peaks in the first list have been processed. At step 650, as desired, the process may continue until all aliased peaks in the first list are processed, and true peak frequency values are found, or otherwise until it is determined that one or more other peaks are identified as aliased, but the true frequency could not be identified.

Accordingly, analysis software as part of multiple embodiments and alternatives herein can use this algorithm process on all of the peaks in every ROI under investigation and ensuring that the analyst does not mistakenly identify a peak frequency. Alternatively, this algorithm could be applied to the waveform resulting from variations in intensity for a single pixel, super pixels derived from a grid superimposed on the field of view or a subset of the pixels in the recording such as those with the largest variations in intensity. This removes the need for any user interaction and could provide a more global warning of the presence of aliased of aliased frequencies.

In some embodiments, a first and a second recording are collected that are identical in all respects except for change in the sampling rate during the recording. A user identifies a region of interest (ROI) on the mechanical structure on the first recording which serves as basis for investigation of the structure. A video processing system with a user interface configured to allow a user to draw a perimeter or ROI within the video frame so that analysis may be focused on that region is contained in U.S. Publication No. 20160217587 titled "Apparatus and Method for Analyzing Periodic Motions in Machinery" published Jul. 28, 2016, the contents of which are expressly incorporated herein by reference for all purposes. Once an ROI is identified, the system software constructs a waveform and calculates the FFT spectrum for the motion in that ROI for the two axes (X and Y) as in FIGS. 2A-2B and 3A-3B, thus showing the movement of the structure in the plane perpendicular to the line of sight between the camera and the ROI. To check for aliasing, the system software performs the following steps:

1. position a ROI on the second recording at exact pixel coordinates of the ROI on the first recording;
2. construct a waveform and calculate the FFT spectrum for the motion in that ROI for the two axes (X and Y) from the second recording;
3. create a list of peaks for both X and Y axes;
4. identify the peaks whose locations have not changed and mark as true peaks
5. for each Axis, mark all other peaks from the first recording as aliased peaks
6. for each Axis, match aliased peaks in the first recording to their matching peak in the second recording and apply the iterative algorithm to identify the true frequency of the aliased peak
7. provide a table or spectral graph that identifies true peaks and aliased peaks with their true frequency value.

The second recording mentioned above, or subsequent recordings, can be acquired with the same camera as the first recording or from a different camera positioned to capture motion of the same object. The numbering provided in the above steps is not meant to indicate that these steps are required to be performed in the exact order shown.

Figure 7:
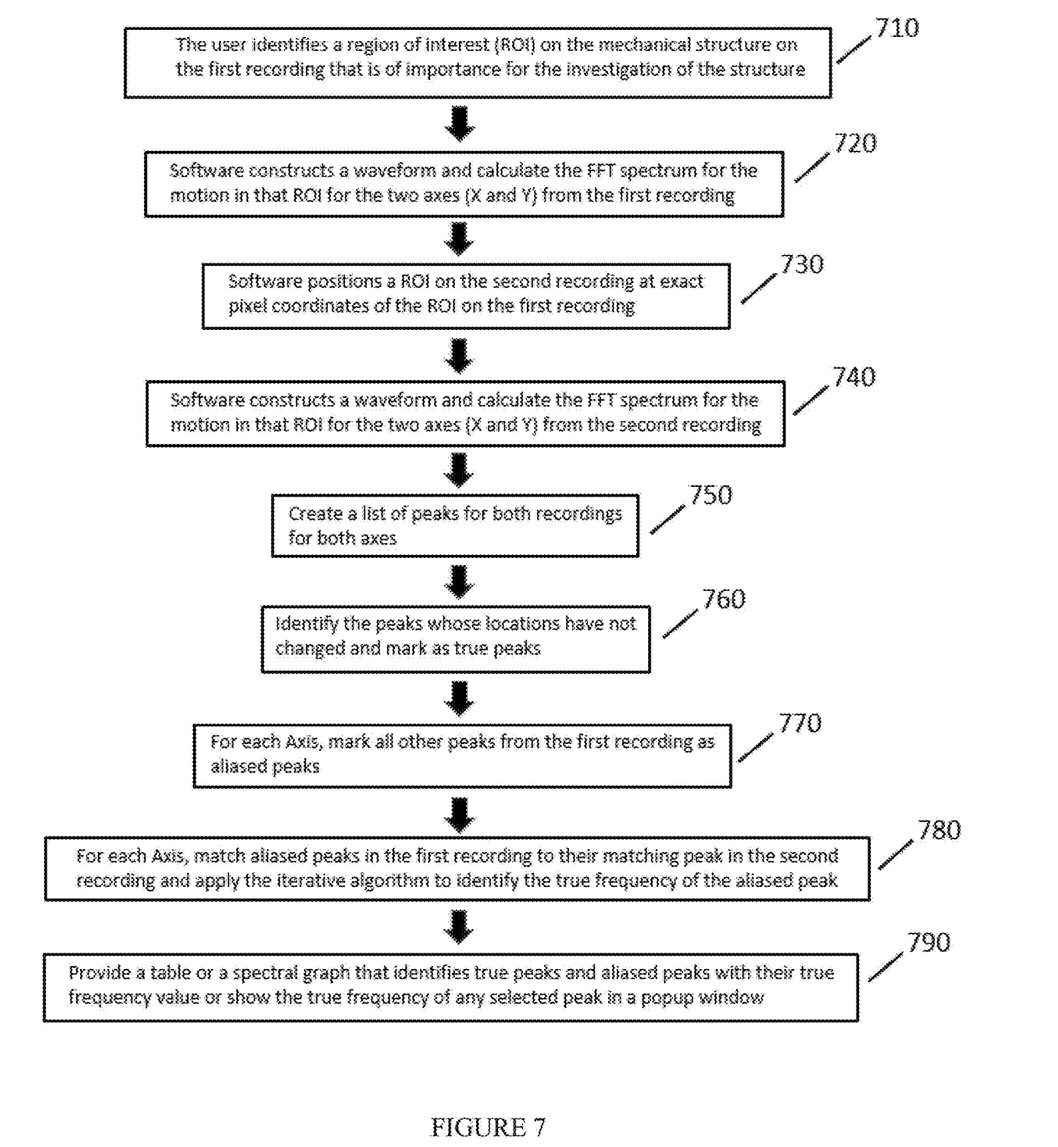
FIG. 7 is a flowchart which outlines the software tasks required to locate the true value of aliased peaks in a video recording, when the locate aliased peak option is active, according to multiple embodiments and alternatives.

Accordingly, FIG. 7 outlines the software tasks required to locate the true value of aliased peaks in a video recording when this option is active. At step 710, a user selects and identifies using a graphical user interface, for example, an ROI of the machine, structure, or machine component depicted in the first recording. At step 720, the software constructs a waveform and calculate the FFT spectrum for the motion in that ROI for the two axes (X and Y) from the first recording, with the X axis being horizontal and orthogonal to the line of sight of the camera and the Y axis being vertical and orthogonal to that line of sight. At step 730, the software then locates the same ROI on the second recording at the same pixel coordinates in the field of view as the ROI in the first recording.

At step 740, the software constructs a waveform, and calculates an FFT spectrum for motion occurring in that ROI from the second recording for the two axes (X and Y). At step 750, the software generates a list of peaks for both axes from both recordings. The software automatically identifies any peaks whose location is unchanged at step 760 and marks or otherwise indicates these as unaliased true frequency values. It will also be appreciated that the approach could be to mark any peaks whose locations have changed, which represent aliased peaks on in a table or on the spectral graph. As desired, the user (or system, automatically), can mark the aliased peaks, as at step 770.

For each axis, at step 780, the software locates the aliased peaks in the first recording to their matching peak in the second recording and then determines the true frequency of each aliased peak using the algorithm documented in FIG. 6. At step 790, the true frequency value of all peaks could be presented in a table and/or the true value could be shown on the spectral graph or substituted for any cursor readout values when a peak is selected graphically. When displayed on a graph, the true frequency of aliased peaks could be labeled on the graph or a spectral graph could be reconstructed such that aliased frequencies were moved to their true frequency location. It will be appreciated that how such data is presented to a user may vary depending on the needs or circumstances of use. For example, a user may want to test a specific peak found in the frequency spectrum, without interrogating each and every peak that is found. This type of approach may be suitable when characteristic frequencies (whether associated with normal or anomalous motion) tend to recur with a specific machine, structure, or machine component. In such cases, the present embodiments allow, for example, for a popup window on the screen showing the spectrum to display information about whether a peak is an aliased peak and, if so, to provide the true frequency calculated as above.

It will be understood that the embodiments described herein are not limited in their application to the details of the teachings and descriptions set forth, or as illustrated in the accompanying figures. Rather, it will be understood that the present embodiments and alternatives, as described and claimed herein, are capable of being practiced or carried out in various ways. Also, it is to be understood that words and phrases used herein are for the purpose of description and should not be regarded as limiting. The use herein of such words and phrases as "including," "such as," "comprising," "e.g.," "containing," or "having" and variations of those words is meant to encompass the items listed thereafter, and equivalents of those, as well as additional items.

Accordingly, the foregoing descriptions of embodiments and alternatives are meant to illustrate, rather than to serve as limits on the scope of what has been disclosed herein. The descriptions herein are not meant to limit the understanding of the embodiments to the precise forms disclosed. It will be understood by those having ordinary skill in the art that modifications and variations of these embodiments are reasonably possible in light of the above teachings and descriptions.

What is claimed is:

1. A method for studying motion of an object using a video recording acquired of the object in motion, comprising:

acquiring a first set of images at a first sampling rate and storing said first set of images depicting a structure, machine, or machine component in a field of view;

acquiring a second set of images at a second sampling rate and storing said second set of images depicting the structure, machine, or machine component in the field of view, wherein the first set of images and the second set of images each comprise a plurality of video frames;

configuring a graphical user interface by which a user selects a structure, machine, or machine component or portion thereof in the field of view by identifying a region of interest (ROI) on at least one of the plurality of frames in the first set of images;

generating a first waveform and a first frequency spectrum of at least one motion of the structure, machine, or machine component in the ROI in the first set of images representing one or more pixels in the first set of images;

generating a second waveform and a second frequency spectrum of at least one motion of the structure, machine, or machine component in one or more pixels in the second set of images corresponding to the ROI represented by the one or more pixels in the first set of images; and automatically detecting one or more frequencies of motion which are aliased peaks whose frequencies are higher than a Nyquist sampling rate of the first frequency spectrum and determining a true frequency value of the aliased peaks in the first frequency spectrum.

2. The method of claim 1, further comprising creating a table of a plurality of peaks in the frequency spectrum including at least one aliased peak and identifying in the table the true frequency value of the at least one aliased peak.

3. The method of claim 1, further comprising configuring the graphical user interface to display a true frequency of at least one aliased peak in response to a user graphically selecting a peak.

4. The method of claim 1, wherein the frequency spectrum represents spectral data, and the second sampling rate is greater than (+/−) 5 times but less than (+/−) 10 times the frequency resolution of the spectral data.

5. The method of claim 1, wherein the at least one motion of the structure, machine, or machine component is within the field of view.

6. The method of claim 1, wherein the aliased frequencies are identified on a frequency spectrum graph at their true frequency location.

7. The method of claim 1, wherein identifying a ROI comprises drawing a ROI on at least one of the plurality of frames in the first set of images.

8. A method for detecting aliased peak frequencies in a video recording acquired of the object in motion, comprising:

acquiring a first set of images at a first sampling rate and storing said first set of images depicting a structure, machine, or machine component in a field of view;

acquiring a second set of images at a second sampling rate and storing said second set of images depicting the structure, machine, or machine component in the field of view, wherein the first set of images and the second set of images each comprise a plurality of video frames consisting of individual pixels organized spatially as an X-Y grid;

generating a waveform of a variation in pixel intensity and transforming the waveform into a frequency spectrum for all or a subset of the individual pixels in the field of view for each set of images; and automatically locating and comparing one or more peaks in the frequency spectra from both sets of images for corresponding pixels to detect one or more frequencies of motion which are aliased in the video recordings due to being digitized at too slow frame rate; and automatically determining a true frequency value of the aliased peak frequencies.

9. The method of claim 8, wherein the aliased frequencies are identified on a frequency spectrum graph at one or more true frequency locations.

10. The method of claim 8, wherein a plurality of frequency peaks is identified in a table where the aliased frequencies are identified, and further comprising providing a true frequency location for the aliased frequencies.

11. The method of claim 8, wherein one or more aliased frequencies are identified on a frequency spectrum graph at their true frequency location when a cursor selects at least one peak at the one or more aliased frequencies.

12. The method of claim 8, wherein one or more aliased peaks are labeled on the frequency spectrum graph with their true values.

* * * * *